United States Patent
Schindele

(10) Patent No.: US 10,286,480 B2
(45) Date of Patent: May 14, 2019

(54) FRICTION APPLICATION DEVICE

(71) Applicant: Hochschule für angewandte Wissenschaften-Fachhochschule Kempten, Kempten (DE)

(72) Inventor: Paul Schindele, Kempten (DE)

(73) Assignee: Hochschule für angewandte Wissenschaften—Fachhochschule Kempten, Kempten (DE)

( * ) Notice: Subject to any disclaimer, the term of this patent is extended or adjusted under 35 U.S.C. 154(b) by 0 days.

(21) Appl. No.: 15/602,822

(22) Filed: May 23, 2017

(65) Prior Publication Data

US 2017/0252856 A1    Sep. 7, 2017

Related U.S. Application Data

(63) Continuation of application No. 14/356,680, filed as application No. PCT/EP2012/004637 on Nov. 7, 2012, now Pat. No. 9,687,934.

(30) Foreign Application Priority Data

Nov. 8, 2011    (DE) .................. 10 2011 117 961

(51) Int. Cl.
     *B23K 20/12*    (2006.01)
(52) U.S. Cl.
     CPC ............ *B23K 20/12* (2013.01); *B23K 20/128* (2013.01); *B23K 20/129* (2013.01); *B23K 20/1215* (2013.01)
(58) Field of Classification Search
None
See application file for complete search history.

(56) References Cited

U.S. PATENT DOCUMENTS

| | | | |
|---|---|---|---|
| 2,770,217 A | * | 11/1956 | Kasak ................. B25B 27/0021 |
| | | | 118/410 |
| 5,971,247 A | | 10/1999 | Gentry |
| 6,722,556 B2 | | 4/2004 | Schilling et al. |
| 6,726,084 B2 | | 4/2004 | Duncan, Jr. |
| 6,726,085 B2 | | 4/2004 | Litwinski |
| 6,758,382 B1 | | 7/2004 | Carter |
| 6,776,328 B2 | | 8/2004 | Rice et al. |
| 7,156,277 B2 | | 1/2007 | Ishikawa et al. |
| 7,641,739 B2 | | 1/2010 | Matlack et al. |

(Continued)

FOREIGN PATENT DOCUMENTS

| DE | 102008044763 A1 | 3/2010 |
|---|---|---|
| EP | 1060826 A1 | 12/2000 |

(Continued)

OTHER PUBLICATIONS

International Search Report received in International Patent Application No. PCT/EP2012/004637, dated Feb. 28, 2013.

*Primary Examiner* — Jethro M. Pence
(74) *Attorney, Agent, or Firm* — Michael Best & Friedrich LLP

(57) ABSTRACT

A friction application device includes an application element which defines a rotational axis and which is movable by a moving device on a surface of a workpiece and in a relative movement with respect to the surface of the workpiece. At least one supporting tool is non-coaxial with the rotational axis and has an arcuate outer periphery in direct contact with the application element.

8 Claims, 10 Drawing Sheets

(56) References Cited

U.S. PATENT DOCUMENTS

| | | | |
|---|---|---|---|
| 8,893,951 B2 | 11/2014 | dos Santos et al. | |
| 2006/0138197 A1 | 6/2006 | Aota et al. | |
| 2006/0191979 A1 | 8/2006 | Lohwasser | |
| 2007/0241163 A1 | 10/2007 | Valant et al. | |
| 2009/0120995 A1 | 5/2009 | Hallinan | |
| 2011/0151109 A1* | 6/2011 | Schindele | B23K 20/1215 427/11 |

FOREIGN PATENT DOCUMENTS

| | | |
|---|---|---|
| EP | 1361014 A2 | 11/2003 |
| EP | 1952931 A1 | 8/2008 |
| GB | 1053148 | 12/1966 |

\* cited by examiner

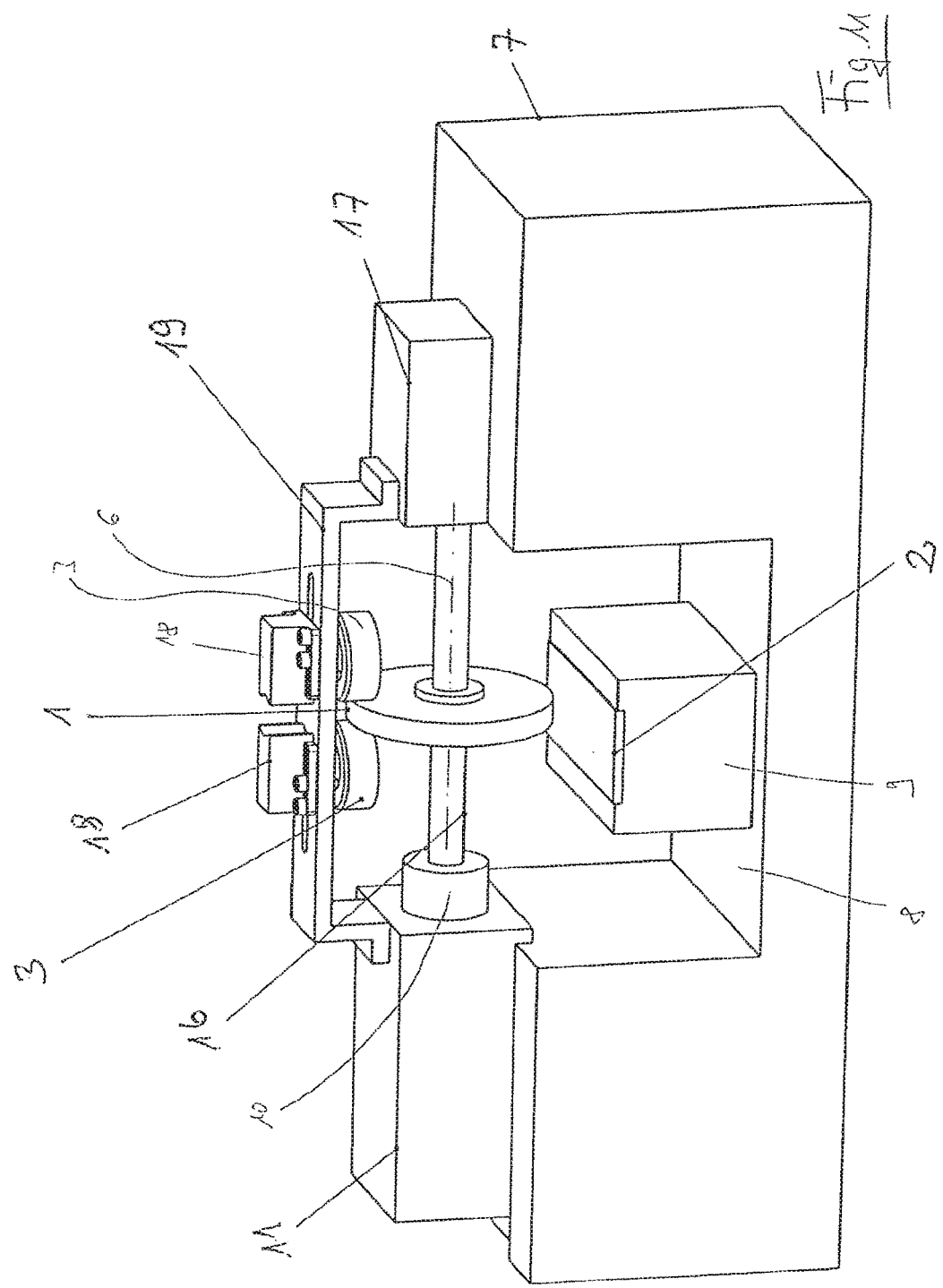

FRICTION APPLICATION DEVICE

BACKGROUND OF THE INVENTION

It is known from the prior art that a material is applied to a surface of a workpiece by means of an application element. This is done by way of a relative movement of the application element relative to the surface of the workpiece. The contact region of the application is plasticized either by way of preheating by means of external heat sources or by friction heat, so that material can be applied. DE 10 2008 044 763 describes a method of such a kind.

Both in the case of cylindrical or rod-shaped application elements which are rotated about their longitudinal axis, and in the case of cylindrical roll-like application elements which are rotatable about an axis arranged perpendicular to the contact plane, a deformation with bead formation is observed with a progressing material application, especially in the case of application elements consisting of metallic materials. This process takes place in the case of friction application welding and also in the case of friction coating.

The bead formation has the effect that less material is available for the application process or coating process proper. Thus, the application element will wear off more rapidly and will have to be replaced more rapidly because the formed bead cannot be used for the application process or coating process. This increases the costs in the application or coating process. A further drawback is that the geometry of the layer applied by the application element (application bead) is not uniform, so that the application process (application coating or application friction welding) cannot be performed optimally.

It is known from GB 1,053,148 A that in friction welding a form element is used for forming the developed weld seam. The formation of a bead is thereby not prevented; rather, the weld seam is formed.

The invention provides a friction application device which, while being of a simple structure and producible in a simple way at low costs, avoids the drawbacks of the prior art and permits a precise material application.

SUMMARY OF THE INVENTION

The invention provides, in one aspect, a friction application device including an application element which defines a rotational axis and which is movable by a moving device on a surface of a workpiece and in a relative movement with respect to the surface of the workpiece. The device also includes at least one supporting tool that is non-coaxial with the rotational axis and having an arcuate outer periphery in direct contact with the application element.

The invention provides, in another aspect, a friction application device including an application element which is movable by a moving device on a surface of a workpiece and in a relative movement with respect to the surface of the workpiece. The device also includes a first supporting tool and a second supporting tool, which form a gap therebetween in which the application element is arranged. Each of the first and second supporting tools has an arcuate outer periphery in direct contact with the application element.

According to the invention it is thus provided that by means of the device according to the invention the application element which is movable by means of a moving device on a surface of a workpiece and which for the purpose of applying material can be brought into a relative movement (turning, rotation, or the like) is supported in its contact region with the surface of the workpiece by at least one supporting tool which prevents bead formation. According to the invention the contact region or the free end portion of the application element is thereby supported laterally, so that only the contact surface on the face side (in the case of a cylindrical application element which is rotatable about its longitudinal axis) or the circumferential surface (in the case of a disc-shaped application element) is in contact with the surface of the workpiece while the adjoining sides of the application element are supported by the at least one supporting tool. Bead formation is thereby prevented because the softened and plasticized application element cannot deform laterally in an undesired manner. Bead formation can thus not occur.

In a particularly advantageous development of the invention it is provided that the supporting tool is arranged on the surface of the workpiece. As an alternative thereto, the at least one supporting tool together with the application element is movable along the surface of the workpiece, so that the supporting tool is not supported on the workpiece, but separately on a moving element of the application element.

In a particularly advantageous configuration of the invention, it is provided that the supporting tool is configured to be bar-shaped, roll-shaped, in the form of tapered rollers, or band-shaped. Depending on the geometry of the supporting tool, two or more supporting tools of such types may be provided. These may roll either on the surface of the application element, as is the case with roll-shaped or tapered supporting tools, they may also be in a slide movement, as is realized in the case of bar-shaped supporting tools, or they may be configured in the form of surrounding bands.

It is particularly advantageous when the supporting tool is supported on a carrier device. In a development of the invention it may here be advantageous when the supporting tool is provided or coupled by means of at least one drive device to perform a relative movement with respect to the surface of the application element.

When several supporting tools are used, it may particularly be of advantage when these are arranged in a position-variable manner. For instance, it is particularly advantageous when the supporting tool permits a relative movement with respect to the surface of the workpiece so as to ensure upon application of a plurality of application webs that the respective supporting tool abuts on the surface of the workpiece and can thereby support the foremost end portion of the application element.

In a development of the invention it is also possible that the carrier device on which the supporting tool(s) is (are) arranged is provided with a heating device so as to heat the application element in addition. It may also be advantageous when the supporting tool is made from a heat-insulating or poorly heat-conducting material so as to avoid, due to its contact with the application element, the withdrawal of heat therefrom. In an alternative configuration of the invention, it is also possible to provide the supporting tool itself with a heating device for heating the application element.

The friction application device according to the invention may be configured as a friction coating device or also as a friction welding device.

BRIEF DESCRIPTION OF THE DRAWINGS

The invention shall now be described with reference to embodiments in combination with the drawing, in which:

FIG. 11 is a perspective view of a further embodiment of a friction application device according to the invention with an application element according to FIG. 2.

DETAILED DESCRIPTION

Figure 1:
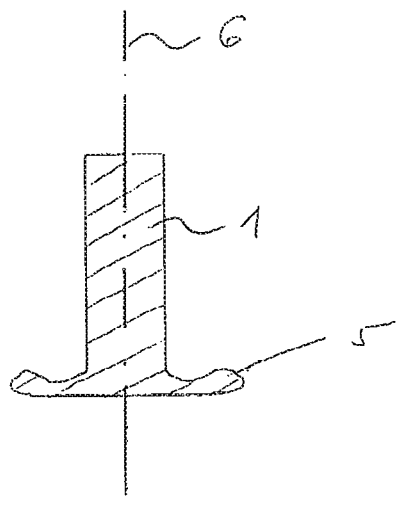
FIG. 1 is a simplified sectional view of an application element according to the invention with bead formation.

FIG. 1 is a simplified sectional view of an application element 1 of the invention, which is configured in the form of a rod and is rotatable about its rotational axis 6. The free end portion of the application element 1 has a bead 5 which is due to deformation of the application element 1 when said element is pressed with a force along the rotational axis 6 against a workpiece surface (not shown) so as to apply material.

Figure 2:
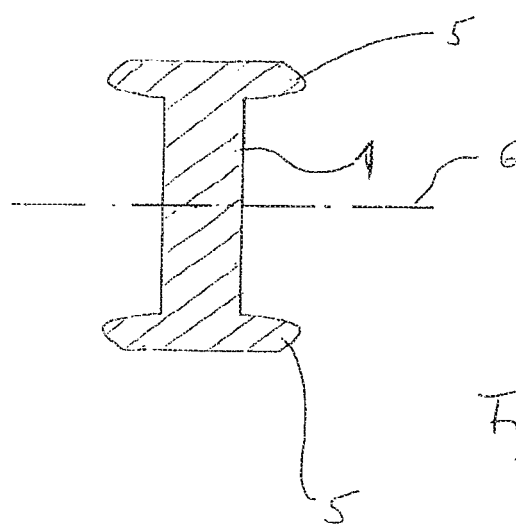
FIG. 2 is a sectional view, by analogy with FIG. 1, of a further embodiment of an application element with bead formation.

By analogy, FIG. 2 shows a disc-shaped application element 1 with a bead 5 on the outer circumferential surface, which is also in contact with a surface of a workpiece upon rotation about the rotational axis 6.

Figure 3:
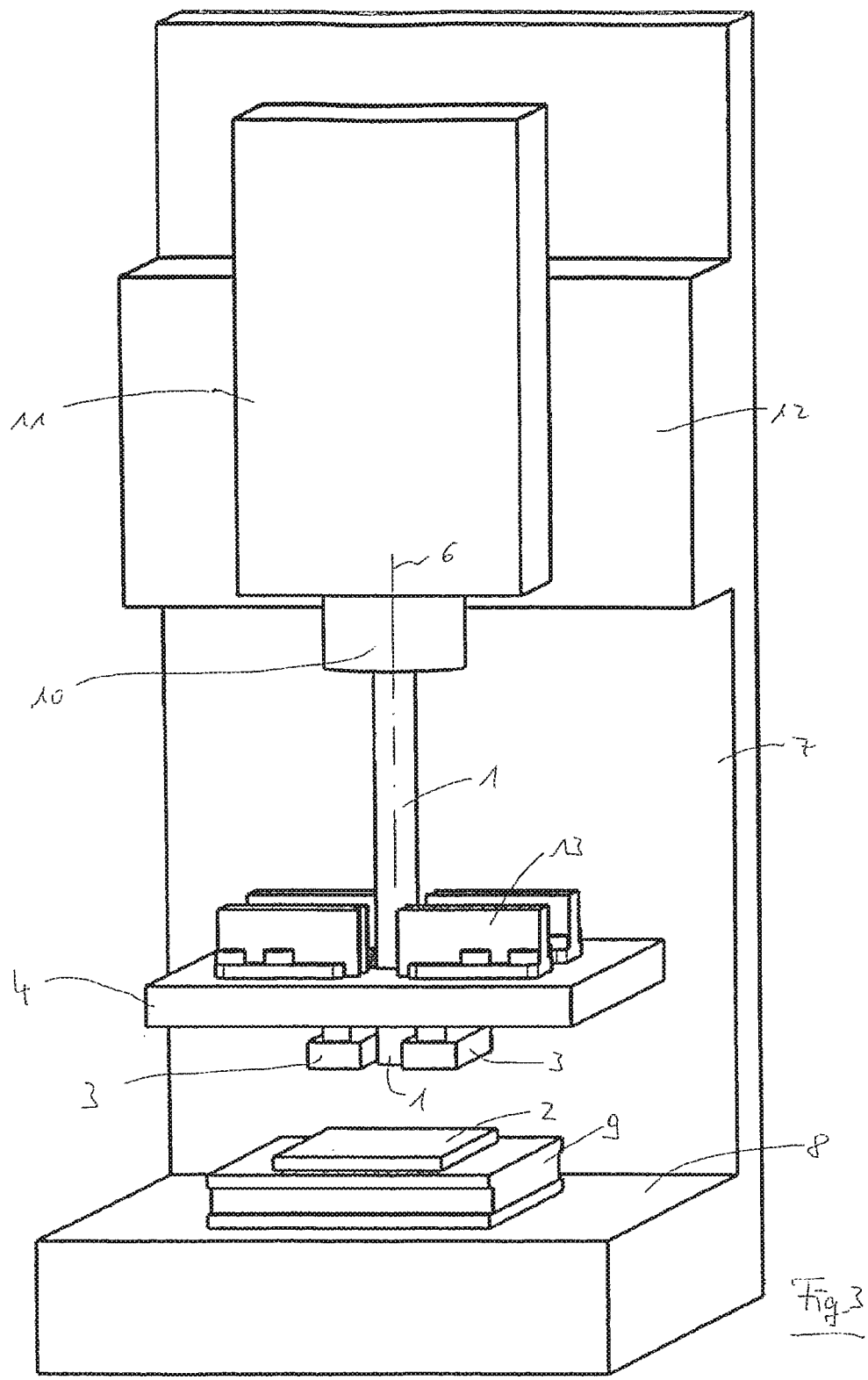
FIG. 3 is a perspective view of a first embodiment of a friction application device according to the invention with supporting elements in the form of bars.
Figure 4:
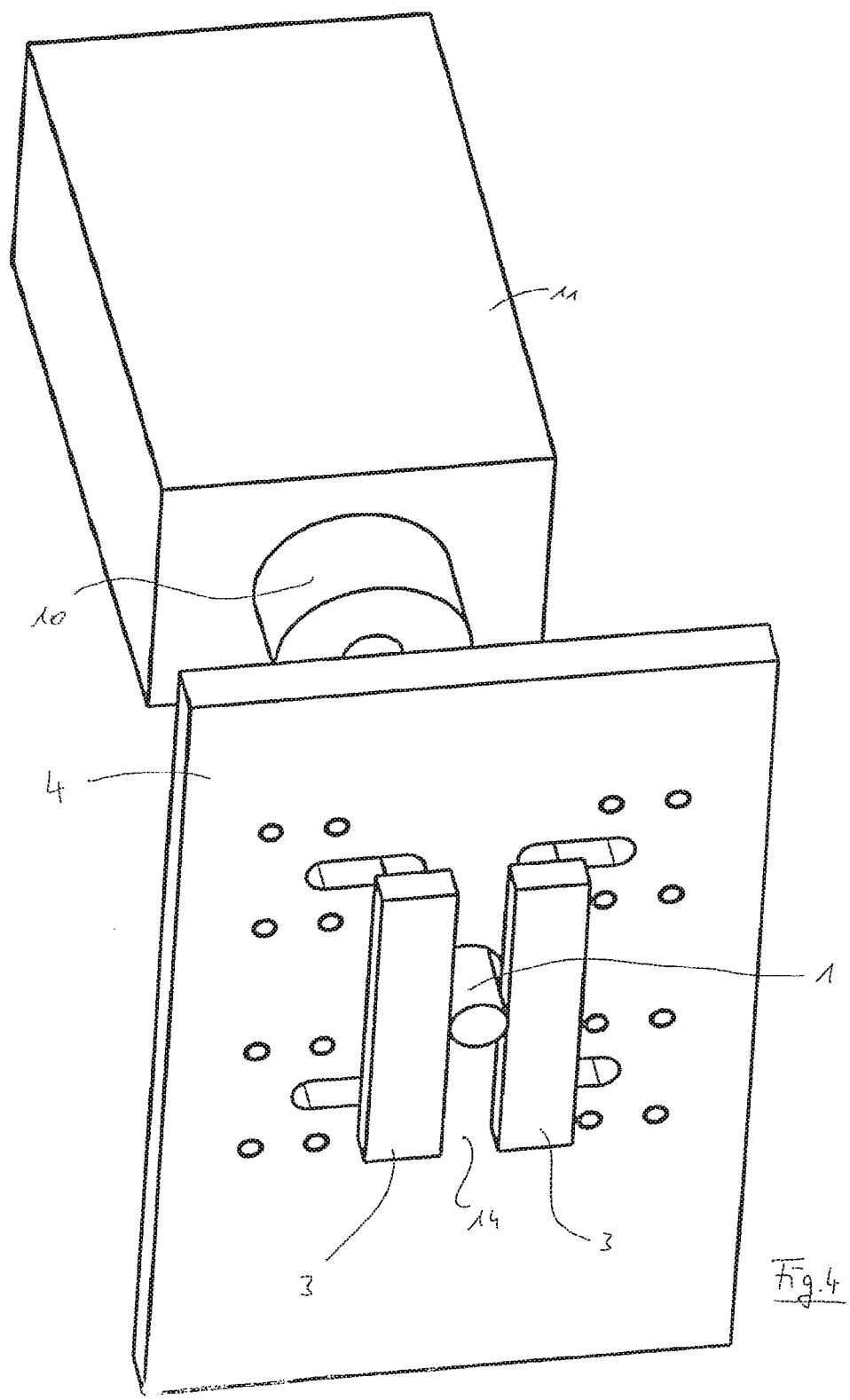
FIG. 4 is a perspective partial bottom view of the embodiment according to FIG. 3.

FIGS. 3 and 4 are each a perspective view of an embodiment of a friction application device according to the invention. Said device comprises a frame 7 with a table 8 which has positioned thereon a holder 9 on which a workpiece 2 is arranged. A support 12 which is only shown schematically and supports a slide 11 via suitable movement paths is formed on the frame 7. A turning spindle 10 on which a rod-shaped application element 1 is supported is arranged on the slide 11 (also only schematically shown). With the help of the turning spindle 10 the application element 1 is put into rotation to apply material by way of a friction contact with the surface of the workpiece 2. Hence, a material web can be applied to the workpiece 2 by way of a suitable movement of the slide 11 and/or of the support 12. The turning spindle 10 and/or the slide 11 are movable in vertical direction to track or reposition the application element 1 so as to implement the material application in this way.

In a schematic illustration, FIGS. 3 and 4 show a carrier device 4 which is also movable relative to the workpiece 2. In the illustrated embodiment, the carrier device 4 is plate-shaped; on its upper side, it carries a plurality of heating elements 13 which are also shown only schematically and heat the application element 1, for instance, by radiation heat.

In the illustrated embodiment, the bottom side of the carrier device 4 has arranged thereon two bar-shaped supporting tools 3 which form a gap 14 or have a mutual spacing in which the application element 1 is arranged in an accurately fitting manner. The two bar-shaped supporting tools thereby abut in the form of rails on the application element 1, which is rotating about its rotational axis 6.

According to the invention it is also possible to fix the rail-like supporting tools, as an alternative to the illustrated variant, also to the workpiece 2 and thus not, as shown in FIGS. 3 and 4, to move them together with the application element. The rail-shaped supporting tools may have a rectangular cross-section, but it is also possible to bevel them in the contact region with the application element 1 so as to counteract the formation of a bead more efficiently.

Figure 5:
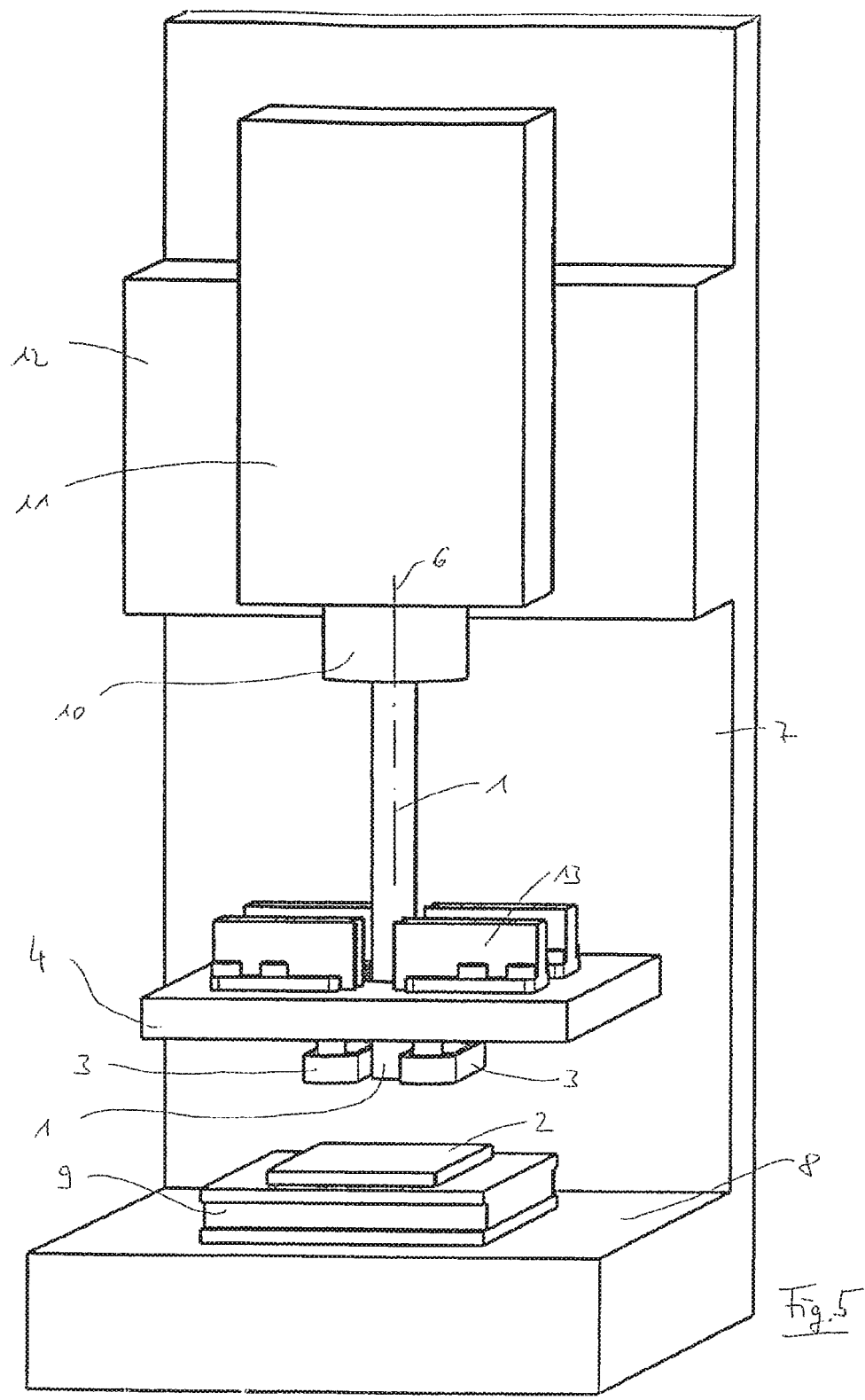
FIGS. 5 and 6 are views, by analogy with FIGS. 3 and 4, of a further embodiment with band-shaped supporting tools.
Figure 6:
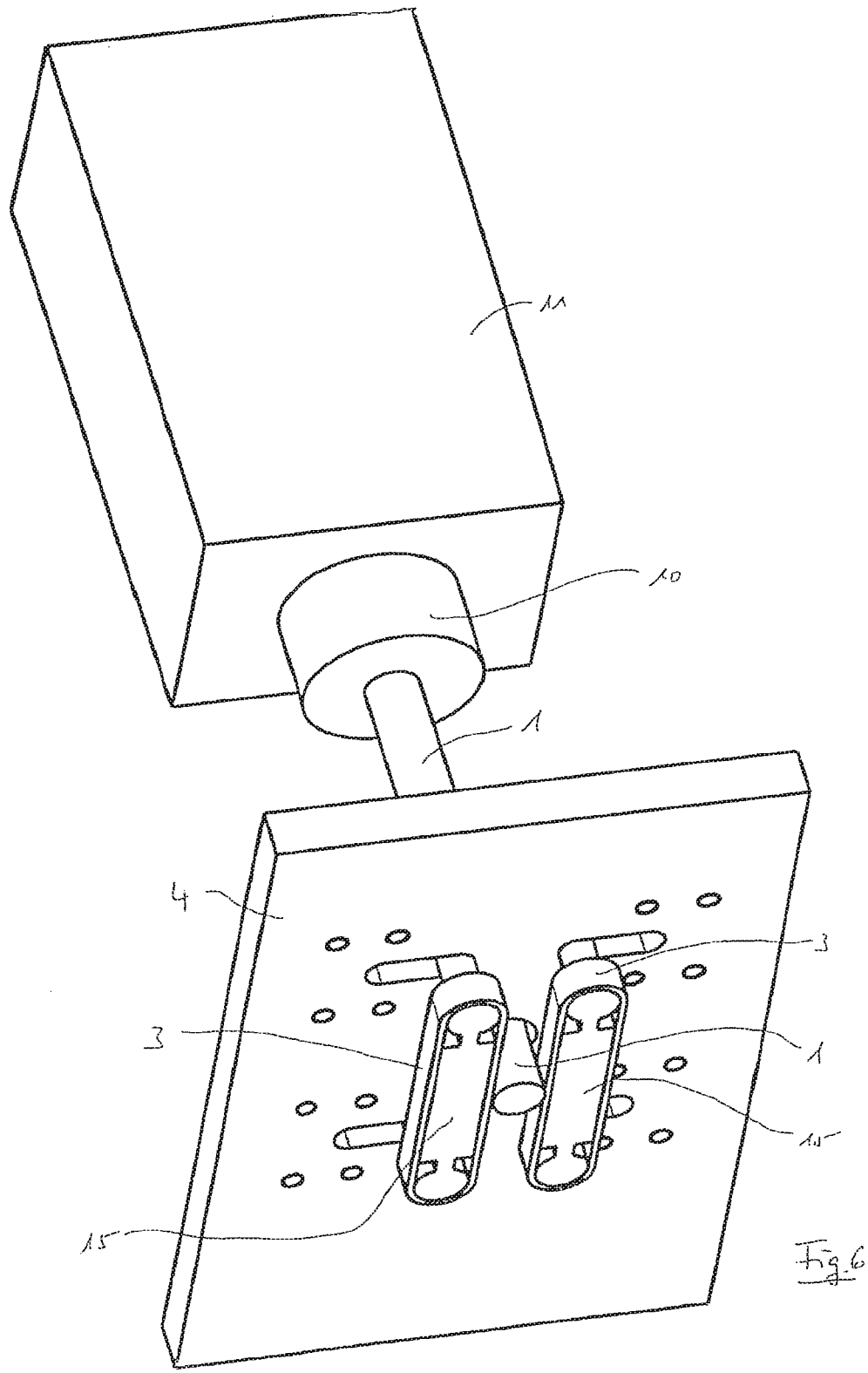

FIGS. 5 and 6 show a further embodiment, wherein, like in the preceding and the subsequent figures, like parts are provided with like reference numerals.

In the embodiment shown in FIGS. 5 and 6, the supporting tools are configured as surrounding boundary bands which are guided by means of a drive (not shown) around a support body 15. Owing to the movement of the band-shaped supporting tools 3 no relative movement occurs between the supporting tools 3 and the application element 1, so that the band-shaped supporting tools 3 carry out a rolling movement and thereby prevent bead formation.

Figure 7:
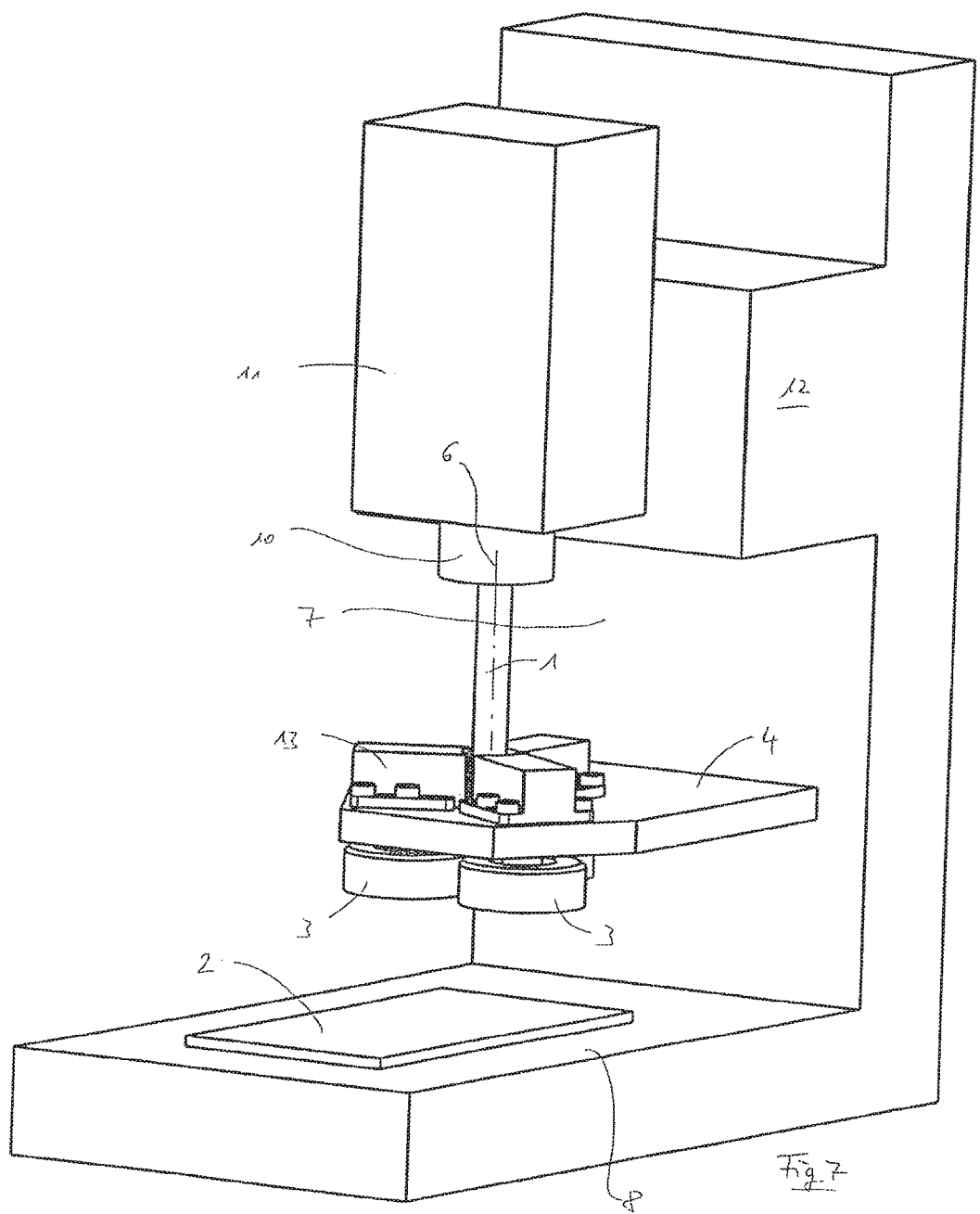
FIGS. 7 and 8 are views, by analogy with FIGS. 3 and 4, of a further embodiment with roll-shaped supporting tools.
Figure 8:
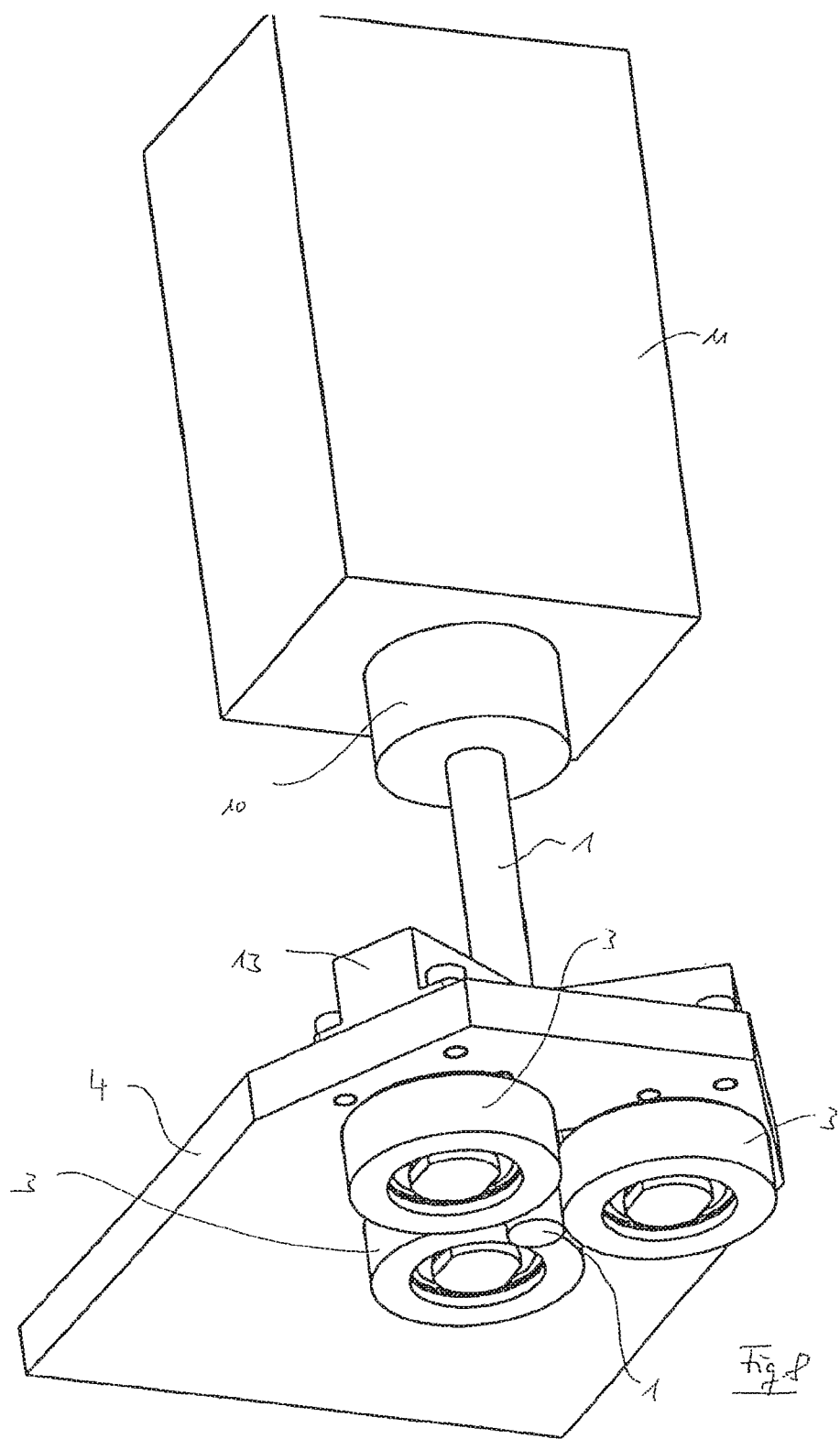

In the embodiment of FIGS. 7 and 8, three supporting tools 3 are provided that are configured in the form of rolls. The supporting tools 3 enclose the free end portion of the application element 1 and support the same, so that no bead is formed and/or that, as in the case of the previously described embodiments, the application element immediately resumes its shape upon bead formation.

In this embodiment, the supporting tools 3 are also rolling on the surface of the application element 1 in a way similar to the embodiment described in FIGS. 5 and 6, so that there is no relative movement, and chip formation caused by a shearing off of the material of the application element can thus not take place either.

Figure 9:
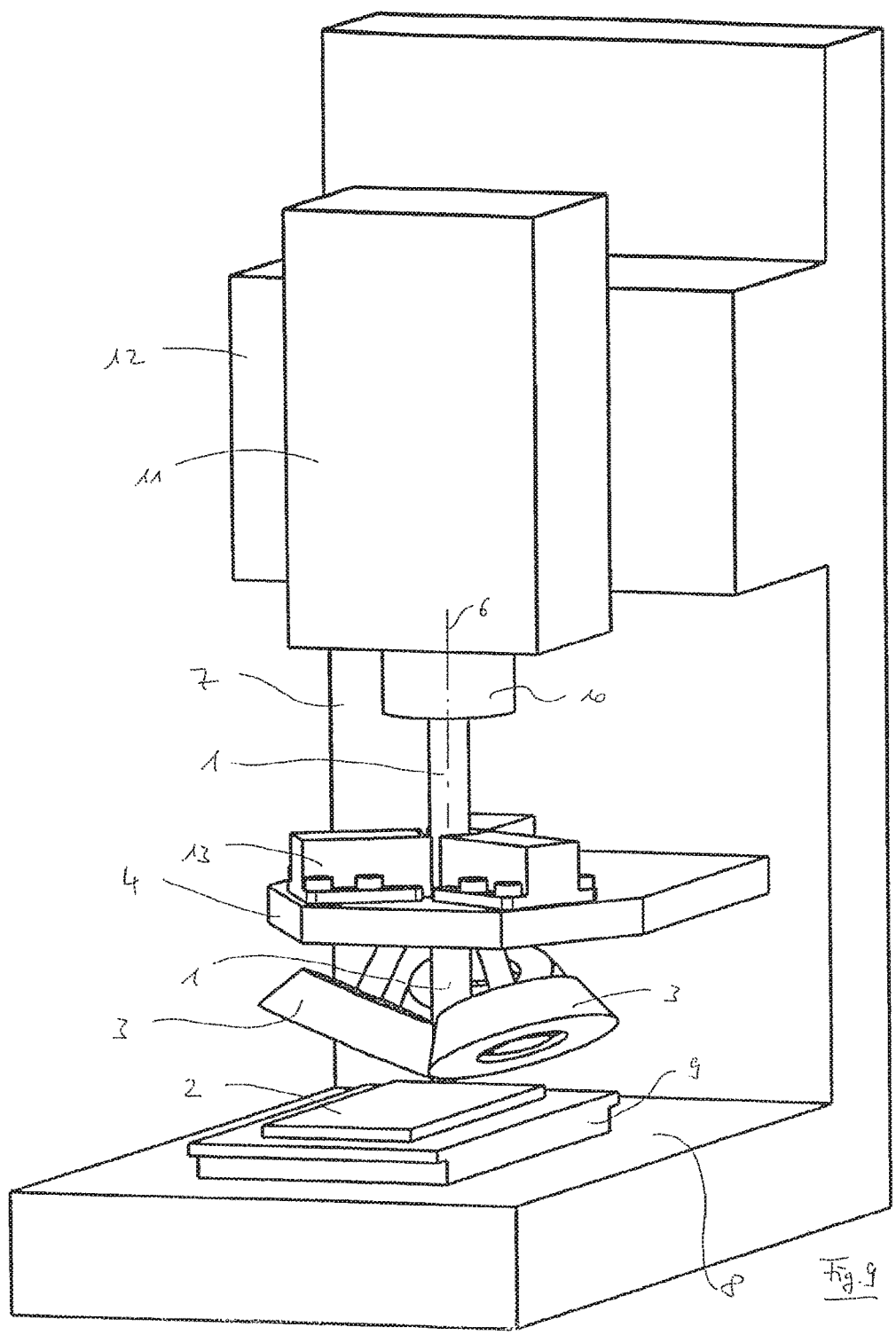
FIGS. 9 and 10 are views, by analogy with FIGS. 3 and 4, of a further embodiment with cone-shaped or tapered supporting tools.
Figure 10:
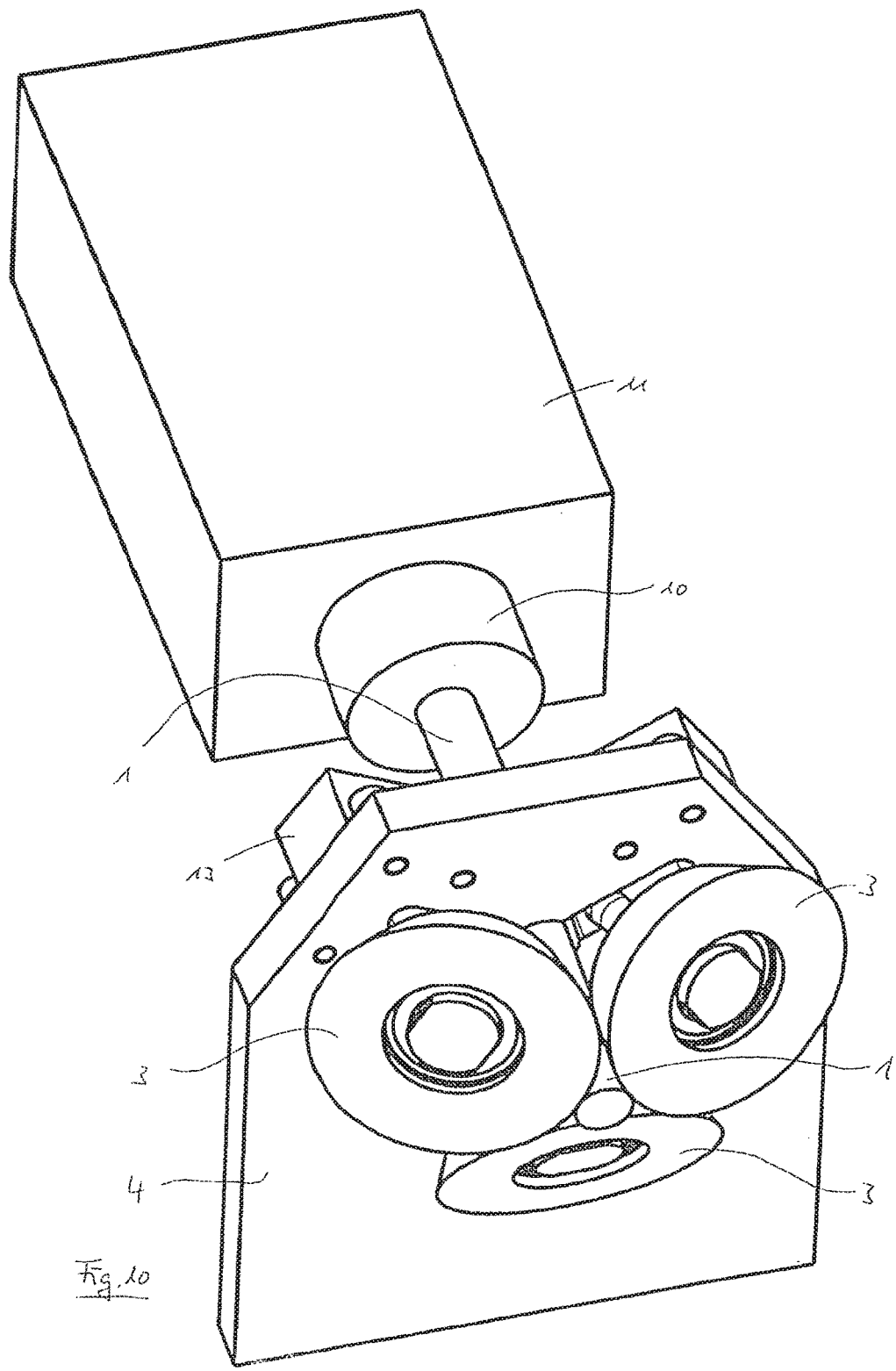

FIGS. 9 and 10 show a further embodiment in which, by analogy with the embodiment of FIGS. 7 and 8, three supporting tools 3 are provided that are cone-shaped or tapered and are inclined in their axes relative to the rotational axis 6 of the application element 1. In this embodiment, it is possible in a particularly efficient manner to avoid bead formation of the end portion of the application element 1, with the supporting tools 3 being not in contact or only in slight contact with the surface of the workpiece 2.

FIG. 11 shows a further embodiment of a friction application device according to the invention, wherein like parts are also provided with like reference numerals as in the preceding embodiments.

As shown in FIG. 2, the application element 1 is disc-shaped and is rotating about its rotational axis 6.

As shown in FIG. 11, a frame 7 has formed thereon a table 8 which carries a holder 9 on which a workpiece 2 is arranged. Said workpiece is friction-coated by contact with the rotating application element 1. For this purpose a shaft 16 which carries the application element 1 is supported on a turning spindle 10 which is supported in a slide 11. The slide 11 also comprises a drive device (not shown), as is also the case with the above-described embodiments. The slide 11 together with a counter bearing 17 supporting the shaft 16 is movable relative to the workpiece 2, either by movement of the holder 9 or by movement of the slide 11 and the counter bearing 17.

Roll-shaped supporting tools 3 are supported, for instance by means of bearing elements 18, on a bridge 19 which connects the slide 11 and the counter bearing 17. The supporting tools 3 roll on the respective surface of the application element and prevent the formation of a bead or the shaping of a bead portion.

Various features of the invention are set forth in the following claims.

The invention claimed is:
1. A friction application device comprising:
an application element which is movable by a moving device on a surface of a workpiece and in a relative movement with respect to the surface of the workpiece; and
a first supporting tool and a second supporting tool, which form a gap therebetween in which the application element is arranged, each include an arcuate outer periphery in direct contact with the application element,
wherein the first supporting tool and the second supporting tool rotate relative to the workpiece.

2. The friction application device according to claim 1, wherein the application element rotates about a first rotational axis, and wherein each of the first and second supporting tools rotates about a second rotational axis perpendicular to the first rotational axis.

3. The friction application device according to claim 1, wherein the first supporting tool, the second supporting tool, and the application element are movable together along the surface of the workpiece.

4. The friction application device according to claim 1, further comprising:
a shaft upon which the application element is supported and co-rotatable therewith;
a spindle coupled to a first end of the shaft for imparting rotation to the shaft; and
a counter bearing rotatably supporting a second end of the shaft.

5. The friction application device according to claim 4, further comprising a slide containing a drive device for imparting rotation to the spindle, wherein the application element is positioned between the slide and the counter bearing in a direction along a rotational axis of the shaft and the application element.

6. The friction application device according to claim 5, further comprising a bridge interconnecting the slide and the counter bearing, wherein the first and second supporting tools are supported on the bridge.

7. The friction application device according to claim 1, wherein the application element is configured as a disk having an arcuate outer peripheral surface, a first side adjacent the arcuate outer peripheral surface and transverse to a rotational axis of the application element, and a second side adjacent the arcuate outer peripheral surface and parallel with the first side, and wherein the arcuate outer peripheries of the first and second supporting tools, respectively, are in direct contact with the first and second sides of the application element.

8. The friction application device according to claim 1, wherein the first and second supporting tools are made from a heat-insulating material or a material of poor heat conductivity.

* * * * *